Sept. 27, 1966 JEAN-PAUL BRUNOT 3,274,857
PRESSURE REGULATOR AND A HYDRAULIC CONTROL
DEVICE INCLUDING SAID REGULATOR
FOR AN AUTOMOBILE GEARBOX
Filed Feb. 8, 1963 2 Sheets-Sheet 2

JEAN-PAUL BRUNOT
INVENTOR

BY J. Delattre-Seguy

ATTORNEY

United States Patent Office
3,274,857
Patented Sept. 27, 1966

3,274,857
PRESSURE REGULATOR AND A HYDRAULIC CONTROL DEVICE INCLUDING SAID REGULATOR FOR AN AUTOMOBILE GEARBOX
Jean-Paul Brunot, Sens (Yonne), France, assignor to Centre de Recherches de Pont-a-Mousson, Pont-a-Mousson (Meurthe-et-Moselle), France, a French body corporate
Filed Feb. 8, 1963, Ser. No. 257,341
Claims priority, application France, Feb. 13, 1962, 887,860, Patent 1,322,233
6 Claims. (Cl. 74—752)

The present invention relates to the hydraulic control of automobile gearboxes of the type having constantly engaged gears and in which certain forward speeds are engaged by means of an automatic distribution or valving of fluid under pressure to jacks adapted to tighten brake bands.

The hydraulic controls of the known mentioned type comprise a device responsive to the speed of the vehicle which, through the medium of other devices, actuates a pilot device controlling the actuation of a speed or gear selector. This speed selector is a pressurized fluid distributor distributing the fluid to the various jacks.

The devices responsive to the speed of the vehicle known at the present time (centrifugal governor or other tachymetric devices) can be mechanical, hydraulic or electric. In particular, the hydraulic devices are of the type comprising centrifugal weights which close to a variable extent the discharge passages for the fluid under pressure leading to the slide-actuated distributors.

These devices are generally delicate to machine and maintain owing to their complex character. They are liable to be sensitive to vibrations, dampness, heat, cold and dust. They require the utilization of more or less complicated intermediate relays in order to transmit their indications to the pilot device.

The object of the invention is to remedy these drawbacks. The invention provides an improved hydraulic pressure regulator which is responsive to the speed of an automobile and permits controlling the changing of the speeds or gears in a hydraulically controlled gear box, this regulator being very simple in construction and insensitive to vibrations, dampness, variations in temperature and dust.

This hydraulic pressure regulator comprises in a fluid-tight cylindrical housing provided with at least one central liquid inlet aperture for liquid from a reservoir having a pressure head, and a peripheral pressure outlet aperture, a wheel having radial blades rotatively mounted in the housing, and means whereby the wheel is rotated by the output shaft of the gearbox for the purpose of creating said pressure in said peripheral aperture.

Another object of the invention is to provide a hydraulic control device for gearboxes having constantly engaged gears and which permits obtaining a number of forward speed transmission ratios between the engine shaft and the output shaft of the gearbox and automatic speed changes between the second transmission ratio and the upper transmission ratios, said device having a hydraulic pilot or control circuit controlling the automatic speed changes between the second transmission ratio and the upper transmission ratios which comprises in combination a liquid reservoir having a pressure head, a pressure regulator for regulating the pressure of the liquid supplied by said reservoir to which it is connected, said pressure regulator being of the aforementioned improved type and being responsive to the speed of the output shaft of the gearbox, a jack connected to the pressure regulator and responsive to the pressure of the liquid created by the regulator, and a pilot distributor actuated by the jack so as to actuate transmission ratio selecting distributors.

The pressure regulator supplies to the jack actuating the pilot device a liquid pressure which depends only on the speed of the bladed wheel and on the specific mass of the liquid. It does not supply liquid. In fact the liquid moves in a to-and-fro manner between this pressure regulator and the jack actuating the pilot device. In the absence of flow, the variations in the viscosity of the liquid have no influence on the pressure of the liquid created by the regulator. Thus, if the liquid is oil, the regulator operates in the same manner in hot weather when the oil is very fluid, as in cold weather when the oil is more viscous.

Further features and advantages of the invention will be apparent from the ensuing description, with reference to the accompanying drawings to which the invention is in no way limited.

Figure 1:
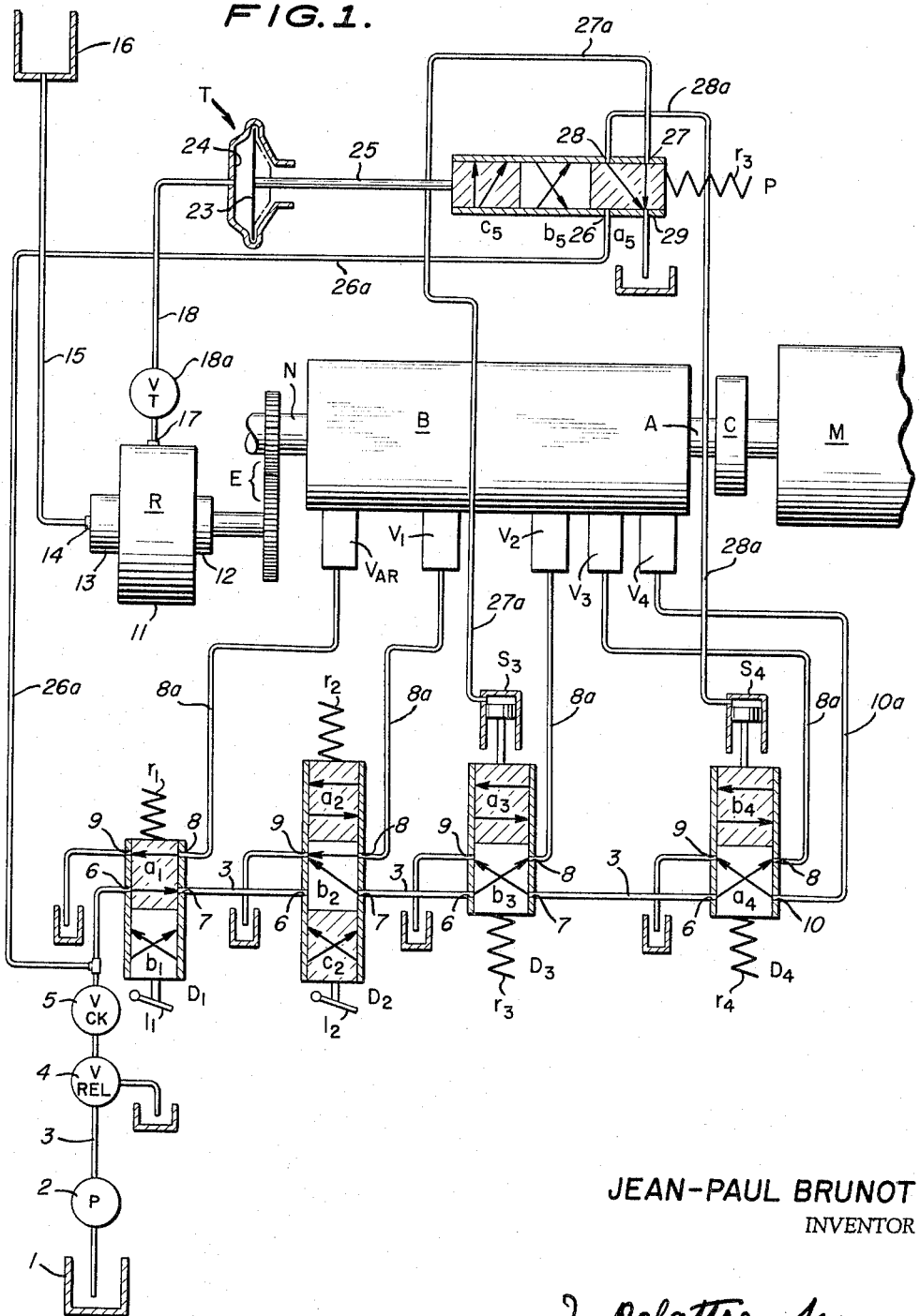
FIG. 1 is a diagrammatic view of a hydraulic control device according to the invention.
Figure 2:
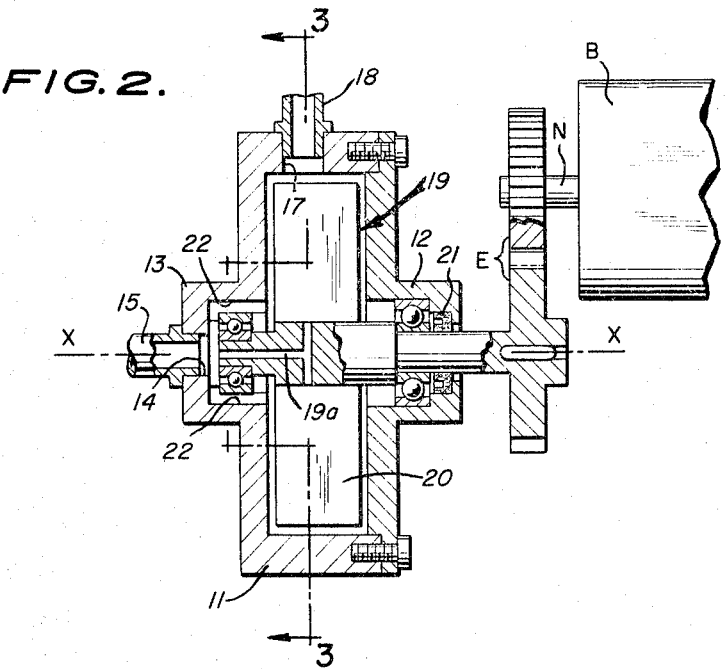
FIG. 2 is a diametral sectional view of the pressure regulator according to the invention incorporated in this control device.
Figure 3:
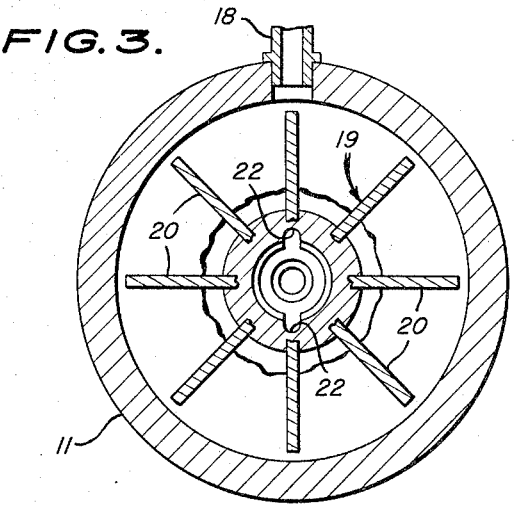
FIG. 3 is a sectional view taken along line 3—3 of FIG. 2.

In the embodiment shown in FIGS. 1–3, the invention is applied to a transmission unit wherein the drive of an engine M is transmitted to the input shaft A of a gearbox B through the medium of a hydraulic coupling C. The gearbox B, which is of any known type having constantly engaged gears, transmits the driving torque to the wheels of the automobile through an output shaft or driven shaft N. The gearbox B is, for example, of the known type having constantly engaged gears providing, for example, four forward speeds (first, second, third and fourth) and a reverse speed (AR) each of which is engaged by the admission of oil into one of five jacks or rams $V_{AR}$, $V_1$, $V_2$, $V_3$, $V_4$, each of them actuating the device engaging one of the speeds. This speed engaging device is for example a brake band which can be tightened by a jack. As is known, whereas the reverse speed (AR), neutral O, and the first speed are engaged manually, the second, third and fourth speeds can be engaged automatically.

In the interests of simplification and clarity, the various elements of the hydraulic control shown in FIG. 1 have been represented in accordance with the rules of symbolic representation of apparatus for hydraulic equipment internationally standardized by French, German (VDMA) and British (British Standard 2917) organizations.

The hydraulic control by means of fluid under pressure, for example oil, comprises two fluid circuits:

An actuating circuit whose conduits, shown in full line, supply the jacks with the oil which treatments thereto the energy for engaging the speeds.

A pilot circuit whose conduits, shown in solid line, supply oil to the apparatus which pilot, that is, control the operation of the actuating circuit.

The discharge conduits are shown in solid line.

I. *Actuating circuit*

It comprises an oil tank from which oil is drawn by a pump 2 driven by the engine M or by the hydraulic coupling C through known means (not shown). The pump 2 pumps the oil through a conduit 3 under maximum pressure $p$ limited by a relief valve 4 rated at this pressure $p$. Mounted in series in the conduit 3 are a check valve 5 and distributors or valves $D_1$, $D_2$, $D_3$, $D_4$, which distribute oil under pressure to the various jacks actuating the gearbox.

Each distributor $D_1$, $D_2$, $D_3$, $D_4$, is of the type having a slide movable in opposition to the action of a spring $r_1$, $r_2$, $r_3$, $r_4$, and is represented symbolically in the form of a rectangle having two or three divisions representing the two or three possible positions of the movable slide.

In each division and therefore in each position of the slide, arrows symbolize the connections between the various apertures of the conduits which communicate with the interior of the outer body of the distributor.

The distributors $D_1$ and $D_2$ are actuated by a hand lever $l_1$ or $l_2$ whereas the distributors $D_3$ and $D_4$ are actuated by servomotors or jacks $S_3$ and $S_4$.

For reasons of clarity, the different positions of the slides of the distributors $D_1$, $D_2$, $D_3$, $D_4$ are represented by blank or cross-hatched divisions. Conventionally, a distributor slide control (hand lever $l_1$, $l_2$, return spring $r_1$, $r_2$, $r_3$, $r_4$, servomotor $S_3$, $S_4$) is symbolically represented adjacent the division that it brings into action when actuated.

Communicating with the interior of the bodies of the distributors $D_1$, $D_2$, $D_3$ are four apertures: an inlet aperture 6 pertaining to the discharge conduit 3, an outlet aperture 7 pertaining to this conduit 3 leading to the following distributors; an aperture 8 pertaining to the conduit 8$a$ supplying the corresponding jack $V_{AR}$—$V_3$ of the gearbox B, and an aperture 9 corresponding to a discharge conduit. The last distributor $D_4$ to which the discharge conduit 3 leads comprises—in addition to the aperture 8 corresponding to the supply conduit 8$a$ of the jack $V_3$ of the third speed—an aperture 10 pertaining to the supply conduit 10$a$ of the jack $V_4$ of the fourth speed. The aperture 10 is in the position of the outlet apertures 7 of the distributors $D_1$, $D_2$, $D_3$.

The slide of the distributors $D_1$ has two positions: a position of rest $a_1$ to which it is urged by the return spring $r_1$, and an operative position $b_1$ to which it is urged by the lever $l_1$: reverse speed (AR) engaged.

The slide of the distributor $D_2$ has three positions: a position of rest $a_2$ to which it is urged by the return spring $r_2$, a middle position $b_2$: neutral position (O) engaged, an operative position $c_2$: first speed engaged.

The slide of the distributor $D_1$ has two positions: a position of rest $a_3$ to which it is urged by the return spring $r_3$, a working position $b_3$: second speed engaged.

The slide of the distributor $D_4$ has two positions: a position of rest $a_4$: third speed engaged, an operative position $b_4$: fourth speed engaged.

II. Pilot circuit

It is controlled by a pressure regulator R which is driven in rotation by the output shaft N of the gearbox, for example through the medium of a pair of gears E.

According to the invention, the pressure regulator R (FIGS. 1–3) comprises a cylindrical housing 11 having an axis XX and bearings 12 and 13. The housing 11 comprises an axial liquid inlet aperture 14, for example for oil, and is connected by a conduit 15 to a reservoir 16 having a pressure head. An oil outlet aperture 17 extending radially in the peripheral wall of the housing 11 is connected by a conduit 18 to a pressure-transmitting device T.

Mounted in the housing 11 is a wheel or impeller having blades 19 and an axis XX which is driven by the output shaft N of the gearbox and journalled in the bearings 12 and 13. This wheel 19 has a number of blades 20, for example straight, and its hub has an axial bore or passageway 19$a$ communicating with the conduit 14 and communicating between the blades 20 with radial oil inlet orifices leading to the interior of the housing 11. A sealing element 21 is mounted in the bearing 12 adjacent the gears E between the housing 11 and one of the journals of the wheel 19, whereas in the bearing 13 passageways 22 put the aperture 14 in communication with the interior of the housing 11.

The pressure-transmitting device E is a jack or ram of, for example, the type having a flexible diaphragm 23 which defines a variable-volume chamber 24. The diaphragm 23 is deformed to the position shown in dotted line as a function of the variable oil pressure supplied by the regulator R to the conduit 18 in accordance with the speed of the output shaft N of the gearbox. The diaphragm 23 is connected to a rod 25 which actuates the rod of a pilot distributor E having a slide and return spring $r_5$.

Four apertures communicate with the interior of the pilot distributor E: the aperture 26 of a conduit 26$a$ supplying oil under pressure and branch connected to the conduit 3 from the pump 2 on the downstream side of the valve 5 (relative to the direction of flow), the aperture 27 of a pilot conduit 27$a$ of the servomotor $S_3$ of the distributor $D_3$, the aperture 28 of a pilot conduit 28$a$ of the servomotor $S_4$ of the distributor $D_4$, and the aperture 29 of a discharge conduit.

The movable slide of the pilot P; subjected to the opposing actions of the rod 25 and a spring, can occupy three positions: $a_5$, $b_5$, $c_5$. The position $a_5$ corresponds to a position of rest due to the action of the return spring $r_5$ and corresponds to an engaged second speed, the position $b_5$ corresponds to an engaged third speed, and the position $c_5$ corresponds to an engaged fourth speed.

III.—Operation

The following table indicates for which respective positions of the pilot P, the servomotors $S_3$ and $S_4$ and the distributors $D_1$, $D_2$, $D_3$, $D_4$, the different transmission ratios are engaged. The sign "—" indicates that the servo motor $S_3$, $S_4$ under consideration is at rest, and the sign "+" that the servomotor is operative.

OPERATIONAL TABLE

| Speed ratios | Pilot P | Servo-motor | | Distributor | | | |
|---|---|---|---|---|---|---|---|
| | | $S_3$ | $S_4$ | $D_1$ | $D_2$ | $D_3$ | $D_4$ |
| Reverse (AR) | $a_5$ | — | — | $b_1$ | $a_2$ | $b_3$ | $a_4$ |
| Neutral | $a_5$ | — | — | $a_1$ | $b_2$ | $b_3$ | $a_4$ |
| 1st | $a_5$ | — | — | $a_1$ | $c_2$ | $b_3$ | $a_4$ |
| 2nd | $a_5$ | — | — | $a_1$ | $a_2$ | $b_3$ | $a_4$ |
| 3rd | $b_5$ | + | — | $a_1$ | $a_2$ | $a_3$ | $a_4$ |
| 4th | $c_5$ | + | + | $a_1$ | $a_2$ | $a_3$ | $b_4$ |

With the engine M operating, the wheel 19 of the regulator R is driven at a speed which is proportional to the speed of the output shaft N of the gearbox. The housing 11 is always filled with oil by the reservoir 16. This oil has zero speed and pressure on the axis of the wheel 19, is driven in motion by this wheel inside the housing 11 but does not circulate outside the latter. It undergoes a simple to-and-fro motion between this housing line 11 and at the periphery of the bladed wheel 19 is transformed into pressure in the aperture 17 and conduit 18, this pressure being a function of the square of the rotational speed of the oil and its specific mass. The variations in the speed of the wheel 19 create pressure variations in the oil in the conduit 18 which is manifested by displacements of the oil in this conduit and deformations of the diaphragm 23 of the jack T. Consequently, the slide of the pilot P is displaced as a function of the oil pressure in the conduit 18 and chamber 24 of the jack T. As there is no discharge of oil out of the regulator R, the oil pressure created by this regulator in the conduit 18 is practically independent of the viscosity of the oil and consequently of its temperature.

With the engine M running, the selection of the transmission ratio for moving off is always effected manually by acting on the control lever of one of the distributors $D_1$ and $D_2$. Whether the vehicle starts to move in reverse first or second gear or speed, the pilot circuit does not intervene. In reverse and in first speed the jack $V_2$ of the second speed, $V_3$ of the third speed and $V_4$ of the fourth speed, are connected to the discharge by the distributors $D_1$ or $D_2$. In second speed, as the vehicle is moving off slowly the pressure of the oil in the conduit 18 due to the regulator R is very low so that the diaphragm 23 of the jack T is not deformed. The slide of the pilot device P subjected to the preponderant action of the return spring $r$ therefore remains in the position $a_5$ corresponding to second speed.

When the speed of the vehicle increases, the wheel 19 of the regulator R rotates at a higher speed so that the pressure in the chamber 24 of the jack T also increases and causes a displacement of the diaphragm 23 which in turn shifts the rod of the pilot P toward the right, as viewed in FIG. 1. Thus, the slide moves automatically from the position $a_5$ corresponding to the second speed to the position $b_5$ corresponding to the third speed only under the effect of the speed of the vehicle without any intervention on the part of the driver. If the vehicle speed continues to increase, the pressure in the chamber 24 also increases and the diaphragm 23 is progressively deformed or inflated until the limit or extreme position shown in dotted line is reached. The slide of the pilot P is then shifted to the extreme position $c_5$ corresponding to the fourth speed in opposition to the action of the return spring which it compresses. Thus the fourth speed is automatically engaged.

Conversely, if the speed of the vehicle decreases, the pressure of the oil in the chamber 24 drops so that under the effect of the spring, the slide of the pilot P moves from the position $c_5$ corresponding to the fourth speed toward the position $b_5$ corresponding to the third speed and the position $a_5$ corresponding to the second speed. Thus the changes from the second to the third and from the third to the fourth speeds are automatic in both directions.

The speed changes are controlled with precision and without beating or hunting. The transmission of the pressure variations of the regulator R when the vehicle slows down has a certain inertia owing to the damping effect produced by the diaphragm 23. This inertia can be accentuated by providing a throttling device in the conduit 18, for example at 18$a$. Thus, when the vehicle slows down, the displacement of the slide of the pilot P from the position $c_5$ or $b_5$ to the position $b_5$ or $a_5$ occurs at a vehicle speed lower than that for which its displacement in the opposite direction from $a_5$ to $b_5$ or from $b_5$ to $c_5$ is obtained when the vehicle accelerates. Consequently, the changing from the upper transmission ratios or speeds down to the lower transmission ratios until the second speed is reached is effected with a certain delay relative to the changing from the lower transmission ratios or speeds up to the upper transmission ratios. In other words, the speed ranges of the vehicle for which the various transmission ratios come into action when the speed drops overlap the speed ranges of the vehicle for which the various transmission ratios come into action when the speed increases. This overlapping due to the inertia of the assembly comprising the regulator R, the conduit 18 and the jack T, precludes hunting of the gearbox, that is, frequent speed changes in both directions between two consecutive transmission ratios in the event of slight variations in the speed of the vehicle in the vicinity of the predetermined speed at which the ratio must be changed. By eliminating this hunting, a rapid wear of the gearbox is avoided. As can be seen, this overlapping is not obtained by complicated devices but merely by the operation of the regulator R in a closed circuit.

The pressure regulator R according to the invention has the advantage of being simple, strong, reliable and faultless in operation irrespective of the temperature and viscosity of the oil. It is combined in a simple manner with the pilot device P of the gearbox.

Although specific embodiments of the invention have been described, many modifications and changes may be made therein without departing from the scope of the invention as defined in the appended claims.

Thus the pressure regulator R can be combined with an electromagnetic control controlling slides distributing oil to the various jacks. In this case, the pilot device is formed by contactors which actuate the electromagnets and are controlled through the medium of the rod 25. Further, the hydraulic control device described hereinbefore has only been mentioned to illustrate the function of the pressure regulator. It can be completed by known devices controlled, for example, by the accelerating pedal of the vehicle so as to modify the engine speed at which the gear ratios of the gearbox are changed as a function of the position of the accelerating pedal by acting on the pilot P in opposition to the action of the jack.

Having now described my invention what I claim as new and desire to secure by Letters Patent is:

1. Hydraulic control device responsive to the speed of rotation of a shaft, said device comprising in combination: a source of liquid, a hydraulic pressure regulator having a fluid-tight housing, a chamber within said housing, a wheel having radially extending blades mounted in said housing to rotate in said chamber about an axis, a driving shaft rotatably mounted in said housing and drivingly connected to said wheel and extending out of said housing, an inlet passageway putting a part of said chamber adjacent the axis of rotation of said wheel in communication with said source of liquid, a pressure outlet passageway communicating with said chamber in a region of the latter adjacent the periphery of said wheel, resiliently yieldable pressure-transmitting control means movable between a first position and a second position in response to hydraulic pressure, and a conduit putting said pressure outlet passageway in communication with said control means, said chamber, said outlet passageway and said conduit constituting a circuit for said liquid between said wheel and said control means which is liquidtight in respect of pressures of said liquid necessary for normal operation of said device so that said liquidtight circuit prevents any escape of said liquid and any relief of the pressure of said liquid pressurized by said pressure regulator in normal operation of said device, whereby a progressively increasing rotational speed of said shaft creates a build up of the pressure of said liquid in said circuit which moves said control means progressively from said first position to said second position thereof.

2. Hydraulic control device as claimed in claim 1, wherein said blades are integral with said shaft and said inlet passageway is located in said shaft and communicates with said chamber between adjacent blades.

3. Hydraulic control device as claimed in claim 1, wherein said resiliently yieldable control means comprise a resiliently flexible diaphragm exposed to the liquid in said conduit.

4. A hydraulic change speed device for changing speeds of a gearbox of a transmission unit having an output shaft in response to the rotational speed of said output shaft, said device comprising hydraulically-actuated elements for respectively changing said speeds of said gearbox, a source of liquid under pressure, a hydraulic actuating circuit connecting said source to said hydraulically-actuated elements, a pilot distributor inserted in said hydraulic actuating circuit and having a slide valve which is slidable between a first position and a second position and controls the supply of said liquid under pressure from said source to each of said hydraulically-actuated elements, movement of said slide valve from said first position to said second position resulting in the course of said movement in said hydraulically actuated means changing up said speeds of said gearbox, a hydraulic control device for shifting said slide valve, said control device comprising a source of liquid, a hydraulic pressure regulator operating on the centrifugal pump principle and having a fluidtight chamber, a rotary impeller in said chamber, a driving shaft, drivingly connected to said impeller, an inlet passageway putting said chamber in communication with the last-mentioned source of liquid and a pressure outlet passageway communicating with said chamber, the pressure of the liquid issuing from said outlet passageway increasing with increase in the rotational speed of said driving shaft, means drivingly connecting said output shaft to said driving shaft, pressure-transmitting control means movable between a first position and a second position, a conduit putting said pressure outlet passageway in communication with said pressure-transmitting control means, said chamber, said outlet passageway and said conduit constituting a pilot control circuit independent of and separate from said actuating circuit, means operatively connecting said pressure-transmitting control means to said slide valve, and resiliently yieldable means biasing said interconnected control means and slide valve towards said first positions thereof, said pilot control circuit being liquidtight and preventing any relief of liquid pressure in respect of a range of pressures of the liquid in said pilot control circuit corresponding to normal operation of said change speed device, whereby a progressively increasing rotational speed of said output shaft produces a build up of the pressure of the liquid in said pilot control circuit having for result a progressive movement of said slide valve from said first position to said second position thereof in opposition to the action of said resiliently yieldable means and a changing of said speeds of said gearbox.

5. A hydraulic change speed device as claimed in claim 4, wherein said impeller has radially extending blades, said inlet passageway communicates with said chamber substantially in the centre thereof, said pressure outlet passageway is located adjacent the path of movement of the outer ends of said blades, and said pressure-transmitting control means is a flexible diaphragm exposed to the liquid in said conduit.

6. A hydraulic change speed device as claimed in claim 4, further comprising throttling means in said conduit whereby the changing down of said speeds of said gearbox corresponding to movement of said slide valve from said second position to said first position thereof under the action of said resiliently yieldable means occurs with a delay relative to the changing up of said speeds for given rotational speeds of said output shaft.

References Cited by the Examiner

UNITED STATES PATENTS

| | | | |
|---|---|---|---|
| 2,223,716 | 12/1940 | Bojesen | 74—752 X |
| 2,269,009 | 1/1942 | Corbin | 73—521 X |
| 2,651,949 | 9/1953 | Barnes | 74—752 |
| 2,845,819 | 8/1958 | Laburte | 74—472.1 X |
| 2,946,240 | 7/1960 | Kop | 74—752 |
| 3,028,847 | 4/1962 | Sterner | 123—103 |
| 3,083,588 | 4/1963 | Christenson | 74—472 |

DAVID J. WILLIAMOWSKY, *Primary Examiner.*

DON A. WAITE, *Examiner.*

J. R. BENEFIEL, *Assistant Examiner.*